United States Patent
Bogdan et al.

(10) Patent No.: US 6,784,150 B2
(45) Date of Patent: Aug. 31, 2004

(54) COMPOSITION OF PENTAFLUOROPROPANE, PENTAFLUOROPROPANE AND WATER

(75) Inventors: Mary C. Bogdan, Buffalo, NY (US); Hang T. Pham, Amherst, NY (US); David J. Williams, East Amherst, NY (US); Leslie Bement, Buffalo, NY (US); Ronald Riegel, Buffalo, NY (US); Rajiv R. Singh, Getzville, NY (US); Kane D. Cook, Eggertsville, NY (US); Gary M. Knopeck, Lakeview, NY (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 10/123,344

(22) Filed: Apr. 16, 2002

(65) Prior Publication Data

US 2003/0199599 A1 Oct. 23, 2003

(51) Int. Cl.$^7$ .............................................. C11D 17/08
(52) U.S. Cl. .......................... 510/406; 252/67; 252/69; 252/182.24; 252/364; 521/131; 521/155; 521/170; 521/174; 510/412; 510/415
(58) Field of Search ................................ 521/131, 155, 521/170, 174; 510/408, 412, 415; 252/67, 69, 364, 182.24

(56) References Cited

U.S. PATENT DOCUMENTS

| 2,834,748 A | 5/1958 | Bailey et al. |
| 2,846,458 A | 8/1958 | Haluska |
| 2,917,480 A | 12/1959 | Bailey et al. |
| 5,296,516 A | 3/1994 | Krueger et al. .............. 521/131 |
| 6,451,867 B1 | 9/2002 | Bogdan et al. |

FOREIGN PATENT DOCUMENTS

| EP | 0 877 045 A | 11/1998 |
| EP | 1 178 062 A | 2/2002 |
| EP | 1 273 604 A | 1/2003 |
| JP | 2002 167419 A | 6/2002 |
| JP | 2002 201251 A1 | 7/2002 |

OTHER PUBLICATIONS

Sato H., et al., "Novel Polyols for All Water–Blown and HCFC–0141b Blown Rigid Polyurethane Foams", *Chemical Divisional R&D Report*, Published Polyurethanes Expo '99 International Technical Conference & Exposition, Sep. 12–15, 1999.

Saunders, J.H. and Frisch, K.C. "Polyurethanes Chemistry and Technology" *Interscience Publishers*, vol. XVI, Part I, 219–223 & Part II, 193–201, 1964.

WO 01 72880 A, Oct. 4, 2001, Guidetti, et al.

WO 01 44325 A, Jun. 21, 2001, Eisen, et al.

*Primary Examiner*—John M. Cooney, Jr.
(74) *Attorney, Agent, or Firm*—Colleen D. Szuch; Deborah M. Chess

(57) ABSTRACT

Disclosed are compositions comprising 1,1,1,3,3-pentafluoropropane, 1,1,1,3,3-pentafluorobutane and water, said compositions are environmentally desirable for use as blowing agents for polymer foam, refrigerants, aerosol propellants, metered dose inhalers, heat transfer media, and gaseous dielectrics.

14 Claims, No Drawings

COMPOSITION OF PENTAFLUOROPROPANE, PENTAFLUOROPROPANE AND WATER

FIELD OF THE INVENTION

The present invention relates generally to compositions comprising hydrofluorocarbons and water. More specifically, the present invention provides compositions comprising pentafluoropropane, pentafluorobutane and water for use in a wide variety of applications including as blowing agents, refrigerants, propellants, solvents, and the like.

BACKGROUND

Hydrofluorocarbons ("HFCs") and HFC-based compositions are of interest for use in replacing environmentally undesirable chlorofluorocarbons ("CFCs") and hydrofluorocarbons ("HCFCs") in a wide range of applications. Applicants have recognized, for example, that many HFC-based compositions are particularly well-suited for use as blowing agents in methods for making rigid foams.

As is known in the art, many rigid foams, including rigid polyurethane and isocyanate foams, are produced by reacting polymerizing reagents in the presence of a blowing agent composition. See, for example, Saunders and Frisch, Volumes I and II Polyurethanes Chemistry and Technology (1962), which is incorporated herein by reference. In general, as the polymerization reagents are reacted, the blowing agent either reacts with one or more of the polymerizing agents, or preferably, is vaporized by the exotherm of the reaction mixture, to form a gas. This gas is then encapsulated by the reaction mixture polymer to create cells which expand the polymer mixture. After expanding, the polymer mixture is cured to form a rigid closed-cell foam.

Applicants have come to appreciate that HFCs, like many other fluorocarbons, tend to be both highly volatile and relatively inert under conventional foam-producing conditions. Accordingly, under such conditions, HFCs tend to vaporize to form HFC vapor which can be encapsulated by a wide variety of polymer mixtures to form rigid foams. The foams produced using such HFC-based blowing agents tend to exhibit desirable thermal characteristics and, thus, applicants have identified HFCs as potential replacement blowing agents of interest.

Applicants have further recognized that certain benefits may be realized by using blowing agent compositions comprising not only HFCs, but also water. Under conventional foam-forming conditions, water tends to react with certain polymerization reactants to form carbon dioxide which can be encapsulated by polymerization reaction mixture to form cells. Accordingly, water contributes to the formation of cells in foams and is suitable for use in blowing agents. Moreover, because water is highly environmentally desirable and has very little cost associated therewith, it can be used in conjunction with HFCs to form blowing agent compositions that are more environmentally desirable and cheaper than compositions comprising HFCs alone.

Unfortunately, while water is highly beneficial for use in blowing agents from both environmental and cost standpoints, applicants have recognized several disadvantages associated with the use of water which counter these benefits. For example, one disadvantage associated with the use of water is that blowing agents containing water tend to produce foams having poorer thermal properties, including poorer thermal insulation, than water-free blowing agents. (See, for example, Sato H., et al., "Novel Polyols for All Water-Blown and HCFC-141b Blown Rigid Polyurethane Foams", *Chemical Divisional R & D Report*, Published Polyurethanes Expo'99 International Technical Conference & Exposition, 9/12–15, 1999; and U.S. Pat. No. 5,296,516 (issued to BASF Corp.), incorporated herein by reference). As noted above, water tends to aid in the blowing of foams by producing carbon dioxide. However, carbon dioxide tends to be a very poor insulating gas, having both a poor vapor thermal conductivity and a very quick diffusion rate. For this reason, foams blown with carbon dioxide tend to have poorer thermal characteristics, including poorer thermal insulation, than foams blown with hydrofluorocarbons alone.

In fact, as will be recognized by those of skill in the art, the thermal insulation characteristics of a foam is expected to worsen significantly as the amount of water in the composition used to blow the foam increases (more carbon dioxide is encapsulated in the foam and thus the foam tends to have more of the poor characteristics associated with carbon dioxide). Accordingly, it is often desirable to minimize the amount of water used in blowing agents to avoid such poor foam characteristics.

Another disadvantage associated with the use of water in blowing agents is that foams produced using water-containing blowing agents tend to degrade faster as the amount of water in the blowing agent is increased. As is known in the art, gasses encapsulated in closed-cell foams tend to diffuse out of the foams over time, resulting in undesirable "aging" of the foam. As used herein the term "aging" refers generally to the physical degradation of a foam and/or a decrease in the thermal insulation associated with a foam. Applicants have determined that carbon dioxide tends to diffuse out of blown foams faster (has a higher diffusion coefficient) than fluorocarbon gasses. Accordingly, foams containing a higher percentage of carbon dioxide (blown with a higher amount of water) tend to diffuse out a higher amount of the gas over time and therefore age faster than foams containing lower levels of carbon dioxide.

Applicants have thus recognized the need for environmentally-desirable and cost-effective compositions that can be used as blowing agents to produce foams having good thermal properties. In particular, applicants have identified a need for compositions containing HFCs and water that produce foams having desirable characteristics, including good thermal insulation and good "aging" characteristics, that are not impaired significantly despite relatively significant changes in the amount of water therein. Unfortunately, such compositions are not only uncommon, but also unpredictable.

DESCRIPTION OF THE INVENTION AND PREFERRED EMBODIMENTS

The present invention overcomes the disadvantages of the prior art by providing a range of compositions comprising both HFCs and water wherein relatively significant variations in the amount of water in the compositions result in unexpectedly minor changes in the thermal properties associated with foams blown with such compositions. More specifically, applicants have identified compositions comprising 1,1,1,3,3-pentafluoropropane ("HFC-245fa"), 1,1,1, 3,3-pentafluorobutane ("HFC-365mfc"), and water wherein the compositions unexpectedly maintain relatively constant thermal properties. That is, the compositions of the present invention comprising relatively higher amounts of water can be used to produce foams having thermal properties that are at least as good, or even better, than the thermal properties of foams formed using the present compositions comprising lower amounts of water. Because the amount of water in the present compositions can vary significantly within the present range of compositions, and higher amounts of water can be introduced in the compositions of the present invention, without significantly reducing the thermal characteristics of the foams produced therewith, the present invention allows for the production of environmentally more desirable and cheaper blowing agent compositions that can be used to produce foams having desirable thermal characteristics.

Applicants have come to appreciate that the range of compositions of the present invention can unexpectedly be used to blow foams having consistently desirable thermal properties, despite a relatively significant variation in water content across the range of compositions. For example, one measure of a foam's thermal insulation properties is its "k-factor". The term "k-factor" refers generally to the rate of transfer of heat energy by conduction through one square foot of one inch thick homogenous material in one hour where there is a difference of one degree Fahrenheit perpendicularly across the two surfaces of the material. Since the utility of closed-cell foams is based, at least in part, upon their thermal insulation properties, it is advantageous and desirable to produce rigid foams having low k-factors. Applicants have discovered surprisingly, and against conventional wisdom, that compositions of the present invention comprising relatively significantly higher amounts of water can be used to produce foams having k-factors that are at least about as low, or even lower, than the k-factors of foams formed using comparable compositions comprising lower amounts of water.

For example, as shown in Table 1, applicants have measured the k-factors of foams prepared using two different, but comparable, compositions (labelled "experiment 1" and "experiment 2") of the present invention. Both the "experiment 1" and "experiment 2" compositions comprise an approximate 1.1:1 mixture of HFC-365mfc and HFC-245fa, respectively. However, experiment 1 further comprises about 2.0 grams of water (about 7 wt. %, based on the total weight of the HFC-365mfc, HFC-245fa, and water) while experiment 2 further comprises only about 0.5 grams of water (about 1 wt. % based on the total weight of the HFC-365mfc, HFC-245fa, and water). Surprisingly, although the experiment 1 composition contained four times (overall) the amount of water, and seven times the relative weight percent of water, as compared to the experiment 2 composition, the foam formed using the experiment 1 composition had a k-factor that was not only about as good, but slightly lower, than the k-factor of the foam formed with the experiment 2 composition. This result illustrates a less than linear increase in the k-factor as the amount of water is increased. Such results are highly unexpected, yet highly desirable.

TABLE 1

| Component (Wt %) | Experiment 1 | Experiment 2 |
| --- | --- | --- |
| Polyol Blend | 95.5 | 95.5 |
| Glycerin | 4.6 | 4.6 |
| Surfactant | 1.0 | 1.0 |
| Catalyst | 1.8 | 1.8 |
| Flame Retardant | 12.0 | 12.0 |
| Water | 2.0 | 0.5 |
| 245fa | 12.2 | 17.6 |
| 365mfc | 13.5 | 19.4 |
| Reactivity Gel time | 30 | 28 |
| Density | 1.91 | 1.87 |
| Thermal Conductivity | Initial | |
| k-factor @ 36.5° F. | 0.1418 | .1421 |
| | 84 Day | |
| k-factor @ 36.5° F. | .1682 | .1685 |

Furthermore, applicants have discovered unexpectedly that foams blown with the compositions of the present invention tend to have highly beneficial aging characteristics. In particular, applicants have determined that foams blown with composition of the present invention containing significantly higher amounts of water tend to age at a rate about the same or less than the rate of degradation of foams blown with composition containing less water. For example, applicants measured the increase in k-factors over time of the foams described above. As shown by the data in Table 1, although the first composition contained four times the amount of water (and seven times the relative weight percent of water) as compared to the second composition, the k-factor of the experiment 1 foam increased at about the same rate (over 84 days) as the k-factor of the foam blown using the experiment 2 composition. Such results are both highly unexpected and desirable.

According to certain embodiments, the compositions of the present invention comprise from about 1 to about 98 weight percent of 1,1,1,3,3-pentafluoropropane, from about 1 to about 98 weight percent of 1,1,1,3,3-pentafluorobutane, and from greater than 0 weight percent to about 15 weight percent of water. According to certain preferred embodiments, the present compositions comprise from about 1 to about 98 weight percent of 1,1,1,3,3-pentafluoropropane, from about 1 to about 98 weight percent of 1,1,1,3,3-pentafluorobutane, and from greater than 0 weight percent to about 13 weight percent of water. In certain more preferred embodiments, the present compositions comprise from about 1 to about 98 weight percent of ,1,1,3,3-pentafluoropropane, from about 1 to about 98 weight percent of 1,1,1,3,3-pentafluorobutane, and from about 1 to about 8 weight percent of water. (All weight percents disclosed herein refer to percent by weight based on the total weight of the HFC/water compositions, unless otherwise specified.)

Uses of the Compositions

The present compositions have utility in a wide range of applications. For example, as indicated above, one application of particular interest is the use of the present compositions as blowing agents in foamable compositions. The present invention provides such blowing agents, foamable compositions, and preferably polyurethane and polyisocyanurate foam compositions, and methods of preparing foams.

In such foam embodiments, one or more of the present compositions are included as a blowing agent in a foamable composition, which composition preferably includes one or more additional components capable of reacting and foaming under the proper conditions to form a foam or cellular structure, as is well known in the art. The present methods preferably comprise providing such a foamable composition and reacting it under conditions effective to obtain a foam, and preferably a closed cell foam. The invention also relates to foam, and preferably closed cell foam, prepared from a polymer foam formulation containing a blowing agent comprising the composition of the invention.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives. It is convenient in many applications to provide the components for polyurethane or polyisocyanurate foams in components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458. Other optional additives for the blowing agent mixture may include flame retardants such as tri(2-chloroethyl)phosphate, tri(2-chloropropyl)phosphate, tri(2,3-dibromopropyl)-phosphate, tri(1,3-dichloropropyl)phosphate, diammonium phosphate, various halogenated aromatic compounds, antimony oxide, aluminum trihydrate, polyvinyl chloride, and the like.

Generally speaking, the amount of blowing agent present in the blended mixture is dictated by the desired foam densities of the final polyurethane or polyisocyanurate foams products. The proportions in parts by weight of the total blowing agent or blowing agent blend can fall within the range of from 1 to about 60 parts of blowing agent per 100 parts of polyol. Preferably from about 10 to about 35 parts by weight of the present composition per 100 parts by weight of polyol are used.

The components of the compositions of the invention are known materials that are commercially available or may be prepared by known methods. Preferably, the components are of sufficiently high purity so as to avoid the introduction of adverse influences upon cooling or heating properties, constant boiling properties, or blowing agent properties of the system. In the case of metered dose inhalers, the relevant current Good Manufacturing Process may be used for manufacturing these materials.

In other embodiments, the compositions of the present invention are used as propellants/solvents in sprayable compositions. In general, sprayable-type compositions comprise a material to be sprayed and a propellant/solvent or mixture of propellant solvents. For the sprayable compositions to be useful, it is necessary that the material to be sprayed be relatively or substantially soluble in the propellant/solvents to be used. While many HFCs alone, such as HFC-245fa, are poor solvents for many conventionally sprayable materials, applicants have recognized that the compositions of the present invention exhibit relatively high solubility with such materials, while also remaining relatively non-flammable.

Any of a wide range of sprayable materials can be used in conjunction with the compositions of the present invention to produce the instant sprayable compositions. Examples of suitable materials include, without limitation, oils and other lubricants, release agents, cleaners, polishing agents, medicinal materials, such as, anti-asthma and anti-halitosis medicines, as well as, cosmetic materials, such as, deodorants, perfumes, hair sprays, and the like.

The sprayable compositions of the present invention may further comprise any of a wide range of inert ingredients, additional solvents, and other materials used conventionally in sprayable compositions.

In still other embodiments, the present compositions are used as refrigerants in any of a wide variety of refrigeration systems.

Additional components may be added to tailor the properties of the compositions of the invention as needed. By way of example, oil solubility aids may be added in the case in which the compositions of the invention are used as refrigerants. Stabilizers and other materials may also be added to enhance the properties of the compositions of the invention.

EXAMPLES

The invention is further illustrated by the following example and comparative example, in which parts or percentages are by weight unless otherwise specified. The following materials were used in the examples.

Polyol Blend

A mixture of polyester polyols commercially available from Dow, Huntsman, and KOSA having hydroxyl numbers ranging from 315 to 630.

Surfactant

A non-silicone based surfactant, which is commercially available from Air Products and Chemicals.

Glycerin which is commercially available.

Catalyst A

A tertiary amine based catalyst, which is commercially available from Air Products and Chemicals.

Flame Retardant

An inorganic phosphate based flame retardant, which is commercially available from Akzo Nobel.

Example 1

This example illustrates the thermal data associated with foams prepared using blowing agent compositions according to the present invention.

Two foams ("Experiment 1" and "Experiment 2") were prepared by a general procedure commonly referred to as "handmixing". For each blowing agent or blowing agent pair, a premix of polyol, surfactant, and catalysts was prepared in the same proportions displayed in Table 1. About 100 grams of each formulation was blended. The premix was blended in a 32 oz paint can, and stirred at about 1500 rpm with a Conn 2" diameter ITC mixer until a homogeneous blend was achieved.

When mixing was complete, the can was covered and placed in a refrigerator controlled at 50° F. The foam blowing agent or pre-blended pair of blowing agents was also stored in pressure bottles at 50° F. The A component was kept in sealed containers at 70° F.

The pre-cooled blowing agent was added in the required amount to the premix. The contents were stirred for two minutes with a Conn 2" ITC mixing blade turning at 1000 rpm. Following this, the mixing vessel and contents were re-weighed. If there was a weight loss, the blowing agent or the blend was added to the solution to make up any weight loss. The can is than covered and replaced in the refrigerator.

After the contents have cooled again to 50° F., approximately 10 minutes, the mixing vessel was removed from refrigerator and taken to the mixing station. A pre-weighted portion of A-component, isocyanurate, was added quickly to the B-component, the ingredients mixed for 10 seconds using a Conn 2" diameter ITC mixing blade at 3000 rpm and poured into a 8"×8"×4" cardboard cake box and allowed to rise. Cream, initiation, gel and tack free times were recorded for the individual polyurethane foam samples.

The foams were allowed to cure in the boxes at room temperature for at least 24 hours. After curing, the blocks were trimmed to a uniform size and densities measured. Any foams that did not meet the density specification 1.9±0.1 lb/ft$^3$ were discarded and new foams were prepared.

After ensuring that all the foams meet the density specifications, the foams were tested for k-factor according to ASTM C518 using a mean temperature of 36.50 F. The k-factor results are listed in Table 1.

As clearly illustrated by the data in Table 1, the foams of experiment 1 and 2 not only have equivalent aging data, but also, the k-factors of the foams produced using the different blowing agents are within 0.0003. Even more unexpectedly, the k-factors of the foam made from the blowing agent of experiment 1 (comprising four times the amount of water of experiment 2) is lower than the foam of experiment 2.

Comparative Example 1

This example illustrates the thermal data associated with foams prepared using blowing agent compositions comprising HFC-245fa and increasing amounts of water.

Four foams (A, B, C, and D) were prepared as described in Example 1 using blowing agents comprising HFC-245fa and water in the amounts indicated in Table 2.

After ensuring that all the foams meet the density specifications, the foams were tested for k-factor according to ASTM C518 using a mean temperature of 75.20 F. The k-factor results are listed in Table 2.

As clearly illustrated by the data in Table 2, the k-factor associated with each of the foams A, B, C, and D steadily increases as the amount of water used in the formulations to prepare the foams is increased.

TABLE 2

| Component (parts by weight) | A | B | C | D |
| --- | --- | --- | --- | --- |
| Polyol Blend | 100 | 100 | 100 | 100 |
| Glycerin | 3.70 | 3.70 | 3.70 | 3.70 |
| Surfactant | 1.50 | 1.50 | 1.50 | 1.50 |
| Catalyst | 1.5 | 1.52 | 1.53 | 1.53 |
| Flame Retardant | 11 | 11 | 11 | 11 |
| Water | 0 | 1.7 | 2.8 | 3.5 |
| 365 mfc | 38 | 25.5 | 20.5 | 17.3 |
| Reactivity | | | | |
| Gel time | 40 | 38 | 35 | 35 |
| Density | 2.9 | 3 | 3 | 3 |
| Thermal Conductivity | Initial | | | |
| k-factor @ 75.2° F. | 0.13 | 0.141 | 0.156 | 0.173 |

What is claimed is:

1. Compositions comprising from about 1 to about 98 weight percent of 1,1,1,3,3-pentafluoropropane, from about 1 to about 98 weight percent of 1,1,1,3,3-pentafluorobutane, and from about 1 to about 8 weight percent of water.

2. The compositions of claim 1, wherein said compositions comprise from about 1 to about 7 weight percent of water.

3. A blowing agent comprising a composition according to claim 2.

4. A blowing agent comprising a composition according to claim 1.

5. A method of preparing polyurethane and polyisocyanurate foam compositions comprising reacting and foaming a mixture of ingredients which react to form polyurethane or polyisocyanurate foams in the presence of a blowing agent composition according to claim 3.

6. A method of preparing polyurethane and polyisocyanurate foam compositions comprising reacting and foaming a mixture of ingredients which react to form polyurethane or polyisocyanurate foams in the presence of a blowing agent composition according to claim 4.

7. A premix of a polyol and a blowing agent comprising a composition according to claim 1.

8. A premix of a polyol and a blowing agent comprising a composition according to claim 1.

9. A closed cell foam composition prepared by foaming a foamable composition containing a composition according to claim 2.

10. A closed cell foam composition prepared by foaming a foamable composition containing a composition according to claim 1.

11. A sprayable mixture comprising a composition according to claim 2.

12. A sprayable mixture comprising a composition according to claim 1.

13. A refrigerant comprising a composition according to claim 2.

14. A refrigerant comprising a composition according to claim 1.

* * * * *